(12) United States Patent
Nishiguchi

(10) Patent No.: US 7,319,646 B2
(45) Date of Patent: Jan. 15, 2008

(54) FOCUS OPERATION FOR AN OPTICAL DISK DEVICE

(75) Inventor: Toshiaki Nishiguchi, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 524 days.

(21) Appl. No.: 10/686,599

(22) Filed: Oct. 17, 2003

(65) Prior Publication Data

US 2004/0109397 A1    Jun. 10, 2004

(30) Foreign Application Priority Data

Dec. 4, 2002    (JP) ............... 2002-352792

(51) Int. Cl.
*G11B 7/00* (2006.01)
(52) U.S. Cl. ............... 369/47.39; 369/47.41; 369/44.32
(58) Field of Classification Search ............. 369/53.18, 369/44.32, 47.39, 47.41
See application file for complete search history.

(56) References Cited

U.S. PATENT DOCUMENTS

| 4,426,690 A | * | 1/1984 | Motoyama | 369/44.25 |
| 4,897,683 A | * | 1/1990 | Suzuki et al. | 396/136 |
| 5,307,336 A | * | 4/1994 | Lee et al. | 369/112.26 |
| 5,351,226 A | * | 9/1994 | Mizumoto et al. | 369/47.39 |
| 5,754,275 A | * | 5/1998 | Takeda | 355/30 |
| 5,831,953 A | * | 11/1998 | Numata | 369/53.23 |
| 6,400,663 B1 | * | 6/2002 | Okada et al. | 369/44.29 |
| 6,834,028 B2 | * | 12/2004 | Itoh et al. | 369/30.17 |
| 6,970,405 B2 | * | 11/2005 | Tateishi et al. | 369/44.32 |
| 2002/0051410 A1 | * | 5/2002 | Okajima | 369/44.27 |

FOREIGN PATENT DOCUMENTS

| JP | 63-138531 A | 6/1988 |
| JP | 1-220226 A | 9/1989 |
| JP | 1-220227 A | 9/1989 |
| JP | 1-220228 A | 9/1989 |
| JP | 5-303751 A | 11/1993 |
| JP | 6-301986 A | 10/1994 |
| JP | 6-325374 A | 11/1994 |
| JP | 9-27129 A | 1/1997 |

* cited by examiner

*Primary Examiner*—Gautam R. Patel
(74) *Attorney, Agent, or Firm*—Birch, Stewart, Kolasch & Birch, LLP

(57) ABSTRACT

A disk device in which at the recovery job of a focus pull-in operation, a CPU supplies servo control means with the respective correction values of the rotational speed of an optical disk and the moving speed of a lens which are described in the data table of a RAM, and performs the focus pull-in operation and determines whether or not the focus pull-in operation is successfully performed at the respective adjustment steps, and if the focus pull-in operation is successfully performed, the servo control means changes the amount of movement of the lens in response to a surface swing of the optical disk.

4 Claims, 4 Drawing Sheets

FOCUS OPERATION FOR AN OPTICAL DISK DEVICE

This nonprovisional application claims priority under 35 U.S.C. § 119(a) on Patent Application No. 2002-352792 filed in JAPAN on Dec. 4, 2002, which is herein incorporated by reference.

BACKGROUND OF THE INVENTION

1. Field of the Invention

This invention relates to an optical disk device which reads a signal recorded on a disk shaped optical recording medium (hereinafter referred to as an optical disk) such as a compact disk (CD), a digital versatile disk (DVD) and so on.

2. Description of the Related Art

An information reproducing device known as an optical disk device in the related art has: rotating means for rotating an optical disk; focusing means having an objective lens for converging an optical beam to be applied to the optical disk on a focusing position; servo control means including a focus servo system and a tracking servo system for controlling a position of the objective lens in the focusing means; motor control means for controlling a number of revolutions of the rotating means; memory for storing data of the rotational speed of the optical disk; and a central processing unit (hereinafter referred to as a CPU) for controlling the servo control means and the motor control means (see, for example, a patent document 1, Japanese Unexamined Patent Publication No. 63-138531, claims, FIG. 1). In this information reproducing device, a light beam spot of the optical beam emitted from an optical head of the focusing means is projected through the objective lens to a recording track of the rotating optical disk and the light beam is moved in the radial direction of the optical disk so as to trace the recording track thereby to optically reproduce information in the recording track.

At this point, the optical disk itself usually has "a warp" and hence it causes a surface swing when it is rotated. Although an allowable amount of surface swing is regulated within a predetermined range by a standard specification, in order to correctly reproduce information in the recording track of the optical disk with the allowable surface swing, it is necessary to correctly bring the optical beam from the optical head of the focusing means to a focusing position on the recording layer of the optical disk which has the surface swing. For this reason, in the information reproducing device in the related art, a focus servo control is performed by which the position of a lens with respect to the recording layer of the optical disk is controlled during reproduction in the direction of the optical axis of the optical beam. In this regard, before performing this focus servo control, every time a disk is loaded on a device and every time reproducing a disk which has already been loaded on a device is started, an operation is performed in which an objective lens in the focusing means is moved within the controllable range of the focus servo control while controlling its moving speed and a focus loop filter is actuated thereby to obtain focus, that is, the so-called focus pull-in operation.

In recent years, however, there has been a tendency to greatly increase the rotational speed of the optical disk at the time of reproducing information. In a case where the focus pull-in operation is performed on the optical disk rotating at such a high speed, when the amount of surface swing of the optical disk which is rotated at the high speed is small, the focus pull-in operation can be successfully performed, but when the amount of surface swing is large, the relative speed of the surface swing of the optical disk to the lens will is made large, so that there is a possibility that the focus pull-in operation will not be successfully completed depending on a timing.

Thus, in the information reproducing device in the related art, rotating means is controlled in such a way that when the distance between the optical disk and the focusing means is brought into the range in which focus can be obtained, the optical disk is rotated at a slower speed than the rotational speed when information is recorded into or reproduced from the optical disk. That is, when the focus pull-in operation is performed, the optical disk is rotated at a slower speed than the rotational speed during recording or reproducing the information.

Next, the focus pull-in operation will be described.

First, after a start-up job of the information reproducing device in the related art has been completed, the optical disk is rotated at a predetermined rotational speed (initial value) which is slower than a rotational speed during recording or reproducing the information, by the rotating means initially set by the motor control means. When the focus servo system of the servo control means is started in this state by a focus pull-in command from logic operation means, the focus servo system reciprocates (moves up and down) the lens along a direction of its optical axis by means of data of the moving speed of the lens and the amount of movement of the lens which are initially set, thereby to perform the focus pull-in operation. At this time, in a case when the logic operation means determines that the focus pull-in operation is not successfully performed, the focus pull-in operation is repeatedly performed as a recovery job under the same conditions until the logic operation means determines that the focus pull-in operation is successfully performed.

In this respect, in a case when the ambient temperature of the information reproducing device is low, a movement of the lens along the direction of its optical axis is made slower as compared with a case where the ambient temperature is high, so that even if the same amount of movement of the lens is set to the servo control means at the low ambient temperature and at the high ambient temperature, the actual amount of movement of the lens is made smaller at the low ambient temperature than at the high ambient temperature. For this reason, even if the focus pull-in operation is successfully completed at the high ambient temperature, the focus pull-in operation sometimes is not successfully completed at a low ambient temperature.

The information reproducing device in the related art has the above described structure and performs the recovery job under the same conditions even after a case when it is determined that the focus pull-in operation is not successfully performed. Therefore, there is presented a problem that since the rotational speed of the optical disk is initially set at a low speed in the initial focus pull-in operation, a start-up time is extended even when an amount of the surface swing is small.

Moreover, if the amount of movement of the lens is adjusted so as to be suited to the low ambient temperature in the information reproducing device in the related art, in a case when it is determined that the focus pull-in operation is not successfully performed for some reason at the high ambient temperature, there is presented problems that the lens might be brought into contact with the surface of the optical disk to cause a damage to the recording layer of the optical disk and at the same time that the start-up time is extended also in this case.

SUMMARY OF THE INVENTION

The present invention has been made to solve the above described problems and it is an object of the present invention to provide an optical disk device in which an optimal focus pull-in operation can be always performed by varying focus pull-in conditions at a recovery job of the focus pull-in operation.

An optical disk device in accordance with the present invention includes: rotating means for rotating an optical disk; motor control means for controlling a number of revolutions of the rotating means; focusing means having a lens to read a signal which is recorded in a recording layer of the optical disk; servo control means that performs a focus pull-in operation based on a focus error signal and a tracking error signal which are obtained from the focusing means thereby to control a position of the lens; memory means having a data table in which initial values and correction values of a plurality of adjustment items including a rotational speed of the optical disk, a moving speed of the lens and the amount of movement of the lens are described; and logic operation means that issues a correction command of the plurality of adjustment items to the servo control means and determines under respective adjustment conditions whether or not the focus pull-in operation is successfully performed and that in a case when it determines that the focus pull-in operation is not successfully performed, newly sets the respective correction values which are stored in the data table in the memory means to the servo control means and repeats the focus pull-in operation until it determines that the focus pull-in operation is successfully performed.

Therefore, according to the present invention, it is possible to quickly complete the focus pull-in operation irrespective of the magnitude of the surface swing caused by the "warp" of the optical disk and to solve inconvenience of an extended start-up time caused by the focus pull-in operation performed by setting the rotational speed of the optical disk at a slower speed than the rotational speed at the time of reproduction in the optical disk device in the related art.

DETAILED DESCRIPTION OF THE PREFERRED EMBODIMENTS

The preferred embodiments of the present invention will be explained in the following description.

Embodiment 1

Figure 1:
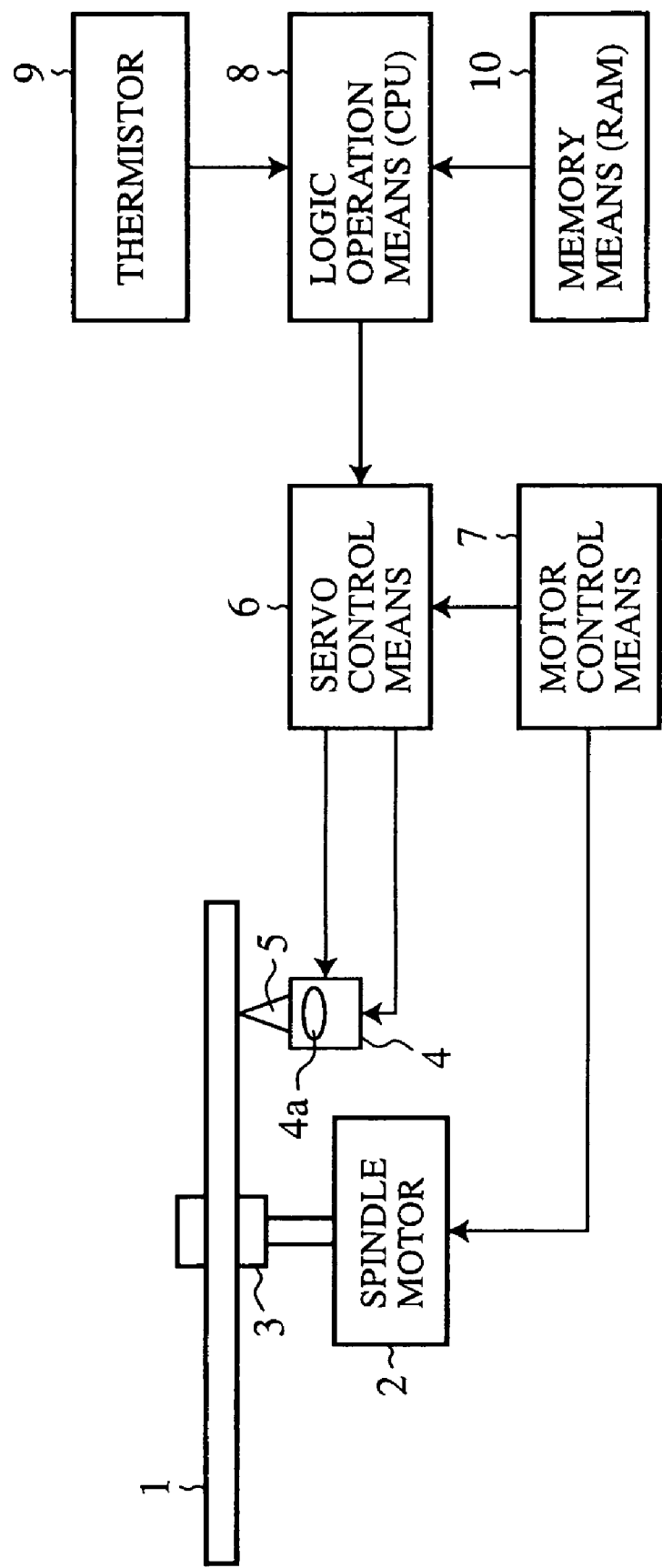
FIG. 1 is a block diagram to show a relevant structure of an optical disk device in accordance with embodiment 1 of the present invention.
Figure 2:
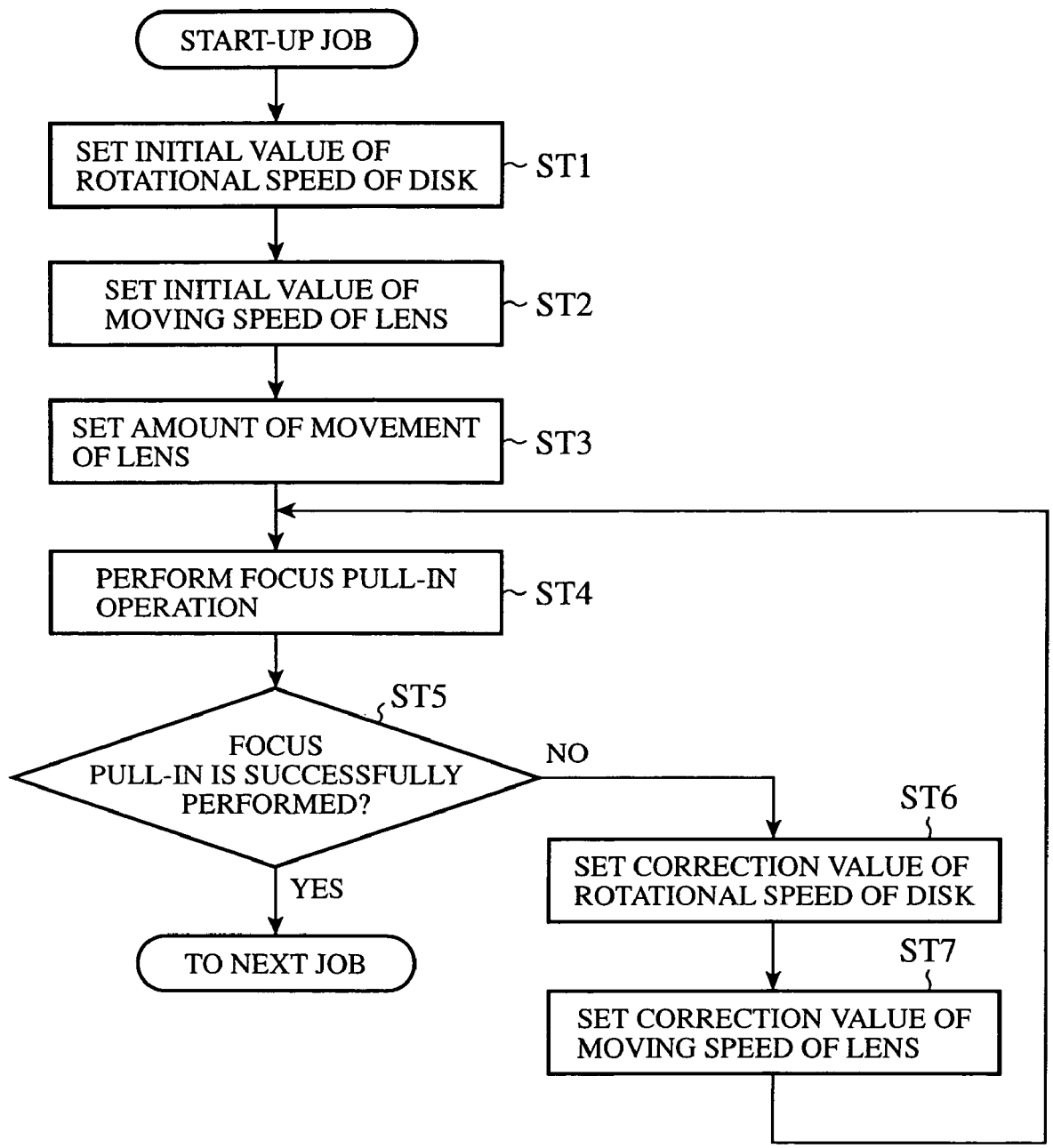
FIG. 2 is a flow chart to show contents of control of a focus pull-in operation in the optical disk device shown in FIG. 1.

FIG. 1 is a block diagram to show a relevant structure of an optical disk device in accordance with embodiment 1 of the present invention. FIG. 2 is a flow chart to show contents of control of a focus pull-in operation in the optical disk device shown in FIG. 1.

In the drawings, an optical disk 1 is placed on a turntable 3 which is capable of rotating within a predetermined speed range by a spindle motor (rotating means) 2. Then, an optical pickup (focusing means) 4 which is capable of moving in a radial direction of the optical disk 1 is arranged under a bottom surface of the optical disk 1. This optical pickup 4 is generally composed of an objective lens (hereinafter referred to as a lens) 4a and two kind of servo mechanisms (not shown) which move the objective lens 4a along a direction of an optical axis (focusing direction) and in a radial direction (tracking direction) of the disk 1. The optical pickup 4 is made to receive light from a light source (not shown) such as a light emitting diode or the like by the lens 4a and to make an optical beam 5. The optical pick up is made capable to project this optical beam 5 onto a recording layer (not shown) of the optical disk 1, whereas the optical pickup 4 can reproduce the optical disk 1 by reading a signal recorded in the recording layer of the optical disk 1. Servo control means 6 that performs a focus pull-in operation and a focus servo control based on a focus error signal and a tracking error signal which are obtained from the optical pickup 4, to control the relative position of the lens 4a in regard to the optical disk 1, is connected to the two kind of servo mechanisms (not shown) of such an optical pickup 4.

Motor control means 7 that controls a number of revolutions of the spindle motor 2 to control the rotational speed of the optical disk 1, is connected to the servo control means 6. Then, a CPU (logic operation means) 8 for controlling a whole device including the servo control means 6 and the motor control means 7, is connected to the servo control means 6. A thermistor (temperature detecting means) 9 for detecting the ambient temperature of the device is connected to the CPU 8. Moreover, to the CPU 8 is connected a random access memory (memory means, hereinafter referred to as a RAM) 10 that has a data table (not shown) in which the initial values and correction values of adjustment items including the rotational speed of the optical disk 1, the moving speed of the lens 4a and the amount of movement of the lens 4a are described, and a data table (not shown) in which the relationship between the ambient temperature obtained by the thermistor 9 and the amount of movement of the lens 4a of the optical pickup 4.

Next, the focus pull-in operation will be described.

First, after a start-up job of the device has been completed, the optical disk 1 is rotated at a predetermined rotating speed (initial value) by the spindle motor 2 driven at the number of revolutions controlled by the motor control means 7 (step ST1). When the servo control means 6 of a focus servo system is started in this state by a focus pull-in command from the CPU 8, the CPU 8 sets the moving speed and the amount of movement (initial values) of the lens 4a of the optical pickup 4 to this servo control means 6 (step ST2 and step ST3). Then, the servo control means 6 reciprocates (moves up and down) the lens 4a along the direction of its optical axis to perform the focus pull-in operation (step ST4). Then, in a case when the CPU 8 determines that a focus pull-in operation is not successfully performed based on a focus error signal and a tacking error signal which are obtained by the optical pickup 4 (step ST5), the CPU 8 performs a recovery job.

In the recovery job in this embodiment 1, the CPU 8 obtains data relating to the respective correction values of adjustment items (rotational speed of the optical disk 1 and the moving speed of the lens 4a) which are described in the data table of the RAM 10 and supplies these data to the servo control means 6 (step ST6 and step ST7) and performs the focus pull-in operation (step ST4) again and determines whether or not the focus pull-in operation is successfully performed (step ST5). At this time, in a case when the CPU 8 further determines that the focus pull-in operation is not successfully performed (step ST5), the CPU 8 obtains data relating to other correction values from the next data in the data table of the RAM 10 and sets the data to the servo control means 6 and performs the recovery job (step ST6 and the step ST7) repeatedly until the CPU 8 determines that the focus pull-in operation is successfully performed (step ST5). In a case where the CPU 8 determines that the focus pull-in operation is successfully performed (step ST5), the CPU 8 moves the operation to the next job. In this regard, once the focus pull-in operation is successfully completed, even if the optical disk 1 still has a reason to cause vibration or a surface swing, the servo control means 6 can change the amount of movement of the lens 4a in response to a change in position of the recording layer (not shown) of the optical disk 1 within a controllable range of the focus servo control.

As described above, since the optical disk device in this embodiment 1 is composed in such a way that the CPU 8 uses the respective correction values of the adjustment items including the rotational speed of the optical disk 1 and the moving speed of the lens 4a which are described in the data table of the RAM 10 in place of the initial values for the recovery job of the focus pull-in operation, it causes an effect that the focus pull-in operation can be completed at an early stage irrespective of the amount of surface swing of the optical disk 1 caused by a "warp" thereof. Therefore, it is possible to produce an effect to prevent an inconvenience of the extended start-up time which is caused in a conventional device in the related art because it performs the focus pull-in operation with the rotational speed of the optical disk 1 that is previously set at a lower speed than the rotational speed at the time of recording or reproducing.

Embodiment 2

Figure 3:
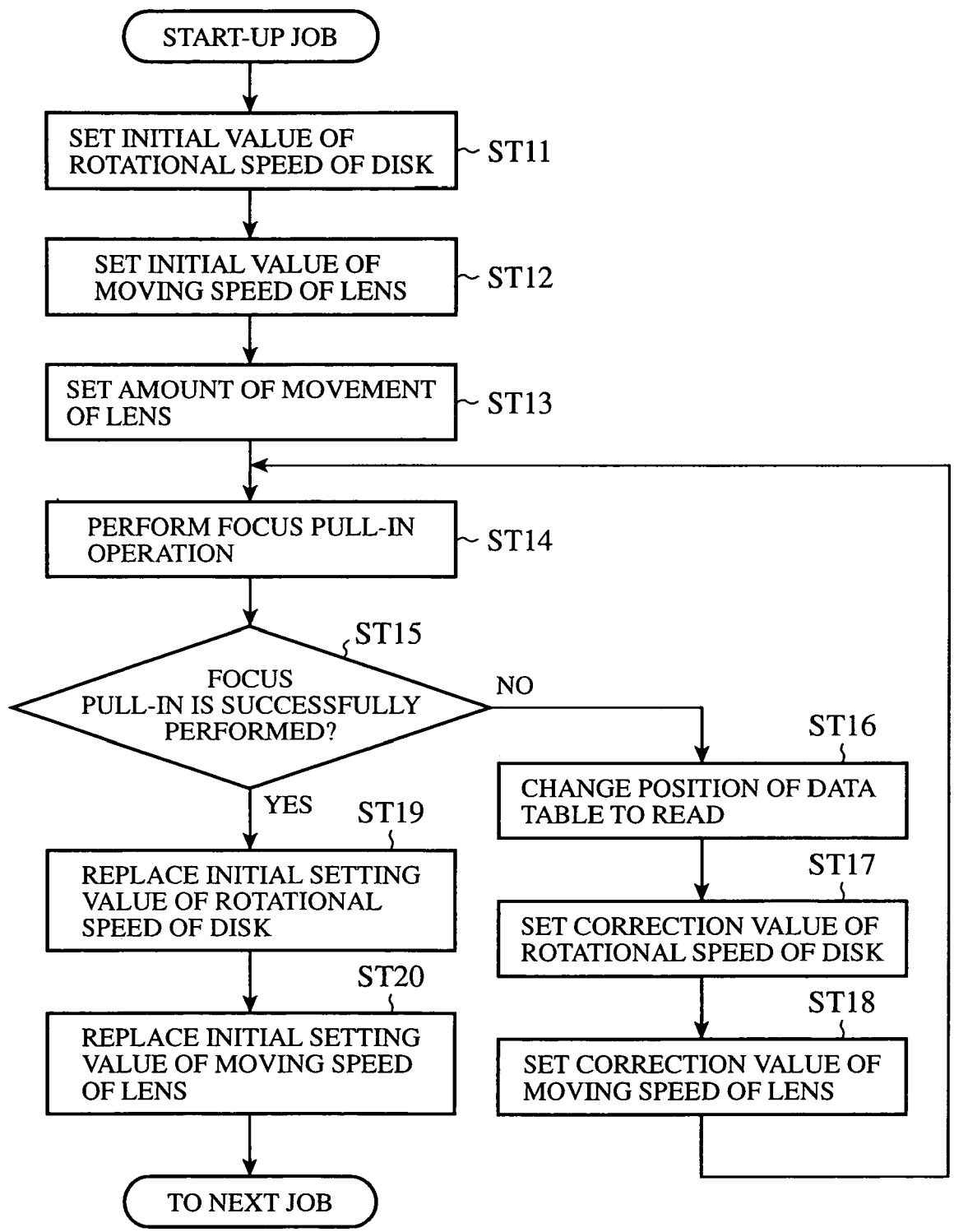
FIG. 3 is a flow chart to show contents of control of a focus pull-in operation in an optical disk device in accordance with embodiment 2 of the present invention.

FIG. 3 is a flow chart to show the contents of control of the focus pull-in operation in an optical disk device in accordance with embodiment 2 of the present invention. At this time, parts common to the constituent elements of the embodiment 1 of the constituent elements of this embodiment 2 are denoted by the same reference symbols and their further descriptions will be omitted. Then, FIG. 1 also shows the structure of the optical disk device in accordance with this embodiment 2.

A feature of this embodiment 2 lies in that in a case when the CPU 8 determines that the focus pull-in operation is successfully performed by means of correction values newly set to the servo control means 6 in the recovery job of the focus pull-in operation, data relating to the respective correction values of the rotational speed of the optical disk 1 and the moving speed or the amount of movement of the lens 4a which are used in the above successful focus pull-in operation, are stored in the data table of the RAM 10 as the initial values to be set to the servo control means 6.

Next, the focus pull-in operation will be described.

First, as shown in FIG. 3, after start-up job of the device has been completed, the optical disk 1 is rotated at a predetermined rotational speed (initial value) by the spindle motor 2 driven at the number of revolutions controlled by the motor control means 7 (step ST11). When the servo control means 6 of the focus servo system is started in this state by a focus pull-in command from the CPU 8, the CPU 8 sets the moving speed and the amount of movement (initial values) of the lens 4a of the optical pickup 4 to this servo control means 6 (step ST12 and step ST13). Then, the servo control means 6 reciprocates (moves up and down) the lens 4a along the direction of its optical axis to perform the focus pull-in operation (step ST14). Next, in a case when the CPU 8 determines that the focus pull-in operation is not successfully performed based on the focus error signal and the tracking error signal obtained from the optical pickup 4 (step ST15), the CPU 8 performs the recovery job.

In the recovery job in this embodiment 2, the CPU 8 changes a position of the data table of the RAM 10 to read and then reads data relating to the respective correction values of the above adjustment items (rotational speed of the optical disk 1 and moving speed of the lens 4a) described in the data table (step ST16) and supplies these data to the serve control means 6 (step ST17 and step ST18) and performs the focus pull-in operation (step 14) again and then determines whether or not the focus pull-in operation is successfully performed (step ST15). At this time, in a case when the CPU 8 further determines that the focus pull-in operation is not successfully performed (step ST15), the CPU 8 obtains data relating to the other correction values from the next data table of the RAM 10 and sets the data to the servo control means 6 and then performs the recovery job (from step ST16 to step ST18) until the CPU 8 determines that the focus pull-in operation is successfully performed (step ST15). In a case where the CPU 8 determines that the focus pull-in operation is successfully performed (step ST15), the CPU replaces data relating to the respective correction values of the rotating speed of the optical disk 1 and the moving speed or the amount of movement of the lens 4a which are used when the CPU 8 determines that the focus pull-in operation is successfully performed, as the initial values to be set to the servo control means 6 (step ST19 and step ST20) and stores the data in the data table of the RAM 10 and then moves the program to the next job. In this regard, this stored data are not erased but held in the data table until the optical disk 1 is removed and are used as the initial values in the next focus pull-in operation to the same disk.

As described above, the optical disk device in this embodiment 2 is composed in such a way that the CPU 8 stores the data relating to the respective correction values of the rotational speed of the optical disk 1 and the moving speed or the amount of movement of the lens 4a which are used when the CPU 8 determines that the focus pull-in operation is successfully performed, as the initial values to be set to the servo control means 6 in the data table of the RAM 10 in a case when the CPU 8 determines that the focus pull-in operation is successfully performed by means of the correction values newly set to the servo control means 6 in the recovery job of the focus pull-in operation, so that the proven correction values of the adjustment items which are used when the CPU 8 determines that the focus pull-in operation is successfully performed, can be effectively used when the next focus pull-in operation to the same disk is performed. Therefore, this embodiment 2 can produce an effect that the focus pull-in operation is completed at an early stage.

The optical disk device in this embodiment 2 is composed in such a way that the stored data are not erased but held in the data table until the optical disk 1 is removed and they are used as the initial values in the next focus pull-in operation to the same disk, so that this embodiment 2 produces an effect that the proven values which are used when the CPU 8 determines the focus pull-in operation is successfully performed, can be effectively utilized when the next focus pull-in operation to the same disk is performed. In this regard, in a case when the optical disk device is, for example, a type of vehicle-mounted optical disk device, it is preferable that a non-volatile memory is used such that the above mentioned data are held until the disk is removed even if the power source of the vehicle is turned off. This is because if the data are held in dependence on the power source mounted on the vehicle, when the main power source is turned off at the end of driving, the effective proven values for the focus pull-in operation are lost.

Embodiment 3

Figure 4:
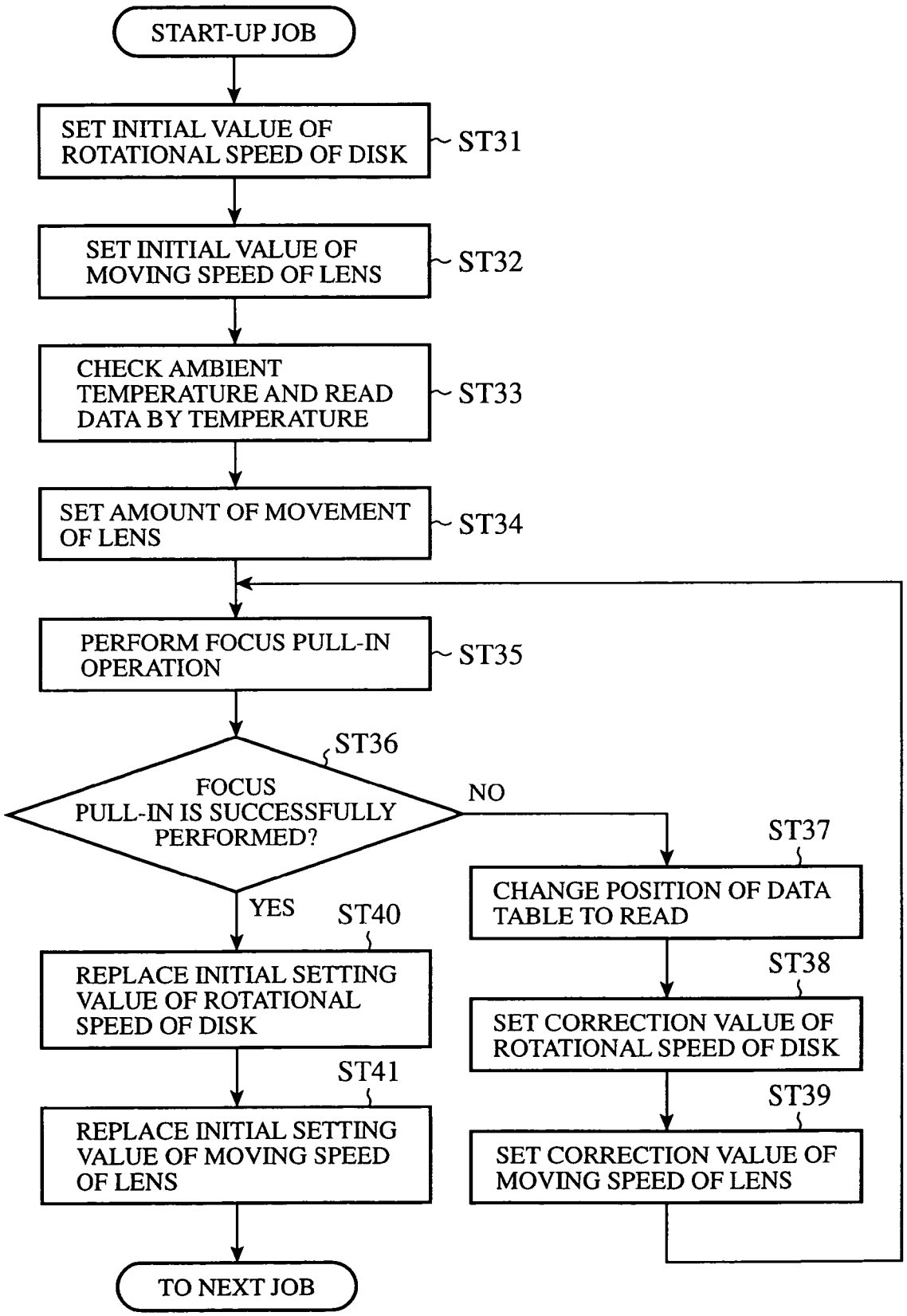
FIG. 4 is a flow chart to show contents of control of a focus pull-in operation in an optical disk device in accordance with embodiment 3 of the present invention.

FIG. 4 is a flow chart to show the contents of control of the focus pull-in operation in an optical disk device in accordance with embodiment 3 of the present invention. At this time, parts common to the constituent elements of the embodiment 1 and the like of the constituent elements of this embodiment 3 are denoted by the same reference symbols and their further descriptions will be omitted. Then, FIG. 1 also shows the structure of the optical disk device in accordance with this embodiment 3.

A feature of this embodiment 2 lies in that the amount of movement of the lens 4a corresponding to the ambient temperature detected by the thermistor 9 is employed as the initial value for the focus pull-in operation in view of the fact that the amount of movement of the lens 4a in the focus pull-in operation is varied by ambient temperature.

Next, the focus pull-in operation will be described.

First, as shown in FIG. 4, after start-up job of the device has been completed, the optical disk 1 is rotated at a predetermined rotational speed (initial value) by the spindle motor 2 driven at the number of revolutions controlled by the motor control means 7 (step ST31). When the servo control means 6 of the focus servo system is started in this sate by a focus pull-in command from the CPU 8, the CPU 8 sets the moving speed (initial value) of the lens 4a of the optical pickup 4 to this servo control means 6 (step ST32) and checks and reads the ambient temperature detected by the thermistor 9 (step ST33) and sets the amount of movement of the lens 4a corresponding to this ambient temperature (step ST34). Then, the servo control means 6 reciprocates (moves up and down) the lens 4a along the direction of its optical axis to perform the focus pull-in operation (step ST35). Next, in a case when the CPU 8 determines that the focus pull-in operation is not successfully performed (step ST36), the CPU 8 performs the recovery job based on the focus error signal and the tracking error signal obtained from the optical pickup 4.

The recovery job in this embodiment 3 is fundamentally the same as the recovery job in the embodiment 2. That is, in the recovery job in this embodiment 3, the CPU 8 changes a position of the data table of the RAM 10 to read and then reads data relating to the respective correction values of the above adjustment items (rotational speed of the optical disk 1 and moving speed of the lens 4a) described in the data table (step ST37) and supplies these data to the serve control means 6 (step ST38 and step ST39) and performs the focus pull-in operation (step 14) again and then determines whether or not the focus pull-in operation is successfully performed (step ST36). In a case where the CPU 8 determines that the focus pull-in operation is not successfully performed, the CPU 8 further performs the focus pull-in operation by means of the correction values newly set to the servo control means 6 (step ST35). At this time, in a case when the CPU 8 further determines that the focus pull-in operation is not successfully performed (step ST36), the CPU 8 obtains data relating to the other correction values from the next data table of the RAM 10 and sets the data to the servo control means 6 and then performs the recovery job (from step ST37 to step ST39) until the CPU 8 determines that the focus pull-in operation is successfully performed (step ST36). In a case where the CPU 8 determines that the focus pull-in operation is successfully performed (step ST36), the CPU 8 replaces data relating to the respective correction values of the rotating speed of the optical disk 1 and the moving speed or the amount of movement of the lens 4a which are used when the CPU 8 determines that the focus pull-in operation is successfully performed, as the initial values to be set to the servo control means 6 (step ST40 and step ST41) and stores the data in the data table of the RAM 10 and then moves the program to the next job. In this regard, this stored data are not erased but held in the data table until the optical disk 1 is removed and are used as the initial values in the next focus pull-in operation to the same disk.

As described above, the optical disk device in this embodiment 3 is composed in such a way that the amount of movement of the lens 4a corresponding to the ambient temperature detected by the thermistor 9 is employed as the initial value for the focus pull-in operation, so that the suitable amount of movement of the lens 4a corresponding to the ambient temperature can be set. Therefore, the optical disk device can produce an effect of moving the lens 4a at all times to a position where the lens 4a can focus on the recording layer (not shown) of the optical disk 1 without being affected by the ambient temperature and thus of optimizing the focus pull-in operation.

What is claimed is:

1. An optical disk device comprising:
    rotating means for rotating an optical disk;
    motor control means for controlling a number of revolutions of the rotating means;
    focusing means having a lens to read a signal which is recorded in a recording layer of the optical disk;
    servo control means that performs a focus pull-in operation based on a focus error signal and a tracking error signal which are obtained from the focusing means thereby to control a position of the lens;
    memory means having a data table in which initial values and correction values of a plurality of adjustment items including a rotational speed of the optical disk, a moving speed of the lens and the amount of movement of the lens are described; and
    logic operation means that issues a correction command of the plurality of adjustment items to the servo control means and determines under respective adjustment conditions whether or not the focus pull-in operation is successfully performed and that in a case when it determines that the focus pull-in operation is not successfully performed, changes position of data read from the data table so as to read correction values, newly sets the respective correction values which are stored in the data table in the memory means to the servo control means, sets the correction value of the rotational speed of the optical disk and moving speed of the lens and repeats the focus pull-in operation until it determines that the focus pull-in operation is successfully performed
    wherein the memory means has a data table in which a relationship between an ambient temperature obtained from temperature detection means and the amount of movement of the lens of the focusing means is described, and the logic operation means uses the amount of movement of the lens corresponding to the ambient temperature obtained from the temperature detection means as an initial value which is set to the servo control means.

2. The optical disk device as claimed in claim 1, wherein the memory means keeps the correction values which are set to the servo control means by the logic operation means, as the initial values which are newly set to the servo control means, in a case when the logic operation means determines that the focus pull-in operation is successfully performed, and hold the newly set initial values in the data table until the optical disk is removed.

3. An optical disk device, comprising:
   a lens that focuses on an optical disk;
   a controller that controls the focusing position of the lens;
   a memory that stores initial data values used by the controller to initially set the lens focusing position based on rotational speed of the disk and moving speed of the lens and also stores correction data values used to perform correction of the lens position after the initial setting of the lens focusing position; and
   a central controller that determines if the lens focusing position is correct at the initial data values and if the focusing position is not correct, changes data read from the memory to the correction data values for the rotational speed of the disk and moving speed of the lens used to position the lens properly if the lens focusing position is not correct using the initial values,
   an ambient temperature measuring device that measures the ambient temperature, where the initial data values are adjusted according to the measured ambient temperature;
   wherein the correction data values, if used to properly position the lens focusing position, are stored in the memory as the initial data values.

4. A method of performing a focusing operation in an optical disk device, comprising the steps of:
   adjusting a focus position of a lens onto a disk using initial data values stored in a memory:
   determining if the focus position using the initial data values is properly positioned;
   measuring the ambient temperature, where the initial data values are adjusted according to the measured ambient temperature;
   adjusting the focus position from the initial data values using correction data values stored in the memory if it is determined that the focus position using the initial data values is not properly positioned;
   determining if the focus position using the corrected data values is properly positioned;
   if it is determined that the focus position is correct storing the corrected data values in the memory as the initial data values, and if it is determined that the focus position is not correct using the corrected data values obtaining another corrected data values from the memory and adjusting the focus position using the another corrected data values until the focus position is correct and storing the another corrected data values from which the correct focus position is determined in the memory as the initial data values.

* * * * *